United States Patent [19]

Laor

[11] Patent Number: 4,651,343

[45] Date of Patent: Mar. 17, 1987

[54] PIEZOELECTRIC APPARATUS FOR POSITIONING OPTICAL FIBERS

[76] Inventor: Herzl Laor, 8 Pines St., Rehovot, Israel

[21] Appl. No.: 630,811

[22] Filed: Jul. 13, 1984

Related U.S. Application Data

[63] Continuation of Ser. No. 230,794, Feb. 2, 1981, Pat. No. 4,543,663.

[30] Foreign Application Priority Data

Feb. 4, 1980 [IL] Israel .................................. 59306
Aug. 6, 1980 [IL] Israel .................................. 60923

[51] Int. Cl.$^4$ ................................................ H04B 9/00
[52] U.S. Cl. ..................................... 455/600; 455/607; 455/612
[58] Field of Search ............... 350/96.15, 96.16, 96.18, 350/96.20; 455/600, 607, 610, 612; 250/227, 578; 358/200, 901

[56] References Cited

U.S. PATENT DOCUMENTS

| | | | |
|---|---|---|---|
| 3,349,174 | 10/1967 | Warschauer | 358/200 |
| 3,470,320 | 9/1969 | Pike | 358/200 |
| 3,507,984 | 4/1970 | Stavis | 358/285 |
| 3,831,035 | 8/1974 | Hill | 250/578 |
| 3,836,225 | 9/1974 | Wilde | 358/285 |
| 3,941,927 | 3/1976 | Russell | 358/285 |
| 3,985,975 | 10/1976 | Steensma | 455/60 |
| 4,065,644 | 12/1977 | Shinosky, Jr. | 455/600 |
| 4,074,142 | 2/1978 | Jackson | 250/578 |
| 4,152,043 | 5/1979 | Albanese | 350/96.20 |
| 4,193,662 | 3/1980 | Hara | 350/96.20 |
| 4,204,742 | 5/1980 | Johnson et al. | 350/96.20 |
| 4,220,396 | 9/1980 | Anteil | 350/96.20 |
| 4,256,927 | 3/1981 | Treheux | 455/607 |
| 4,285,570 | 4/1981 | Minemura | 350/96.18 |
| 4,303,302 | 12/1981 | Ramsey et al. | 350/96.20 |
| 4,365,863 | 12/1982 | Braussaud | 455/612 |
| 4,385,798 | 5/1983 | Yevick | 358/200 |
| 4,498,730 | 2/1985 | Tanaka et al. | 350/96.18 |

FOREIGN PATENT DOCUMENTS

| | | |
|---|---|---|
| 2839444 | 3/1980 | Fed. Rep. of Germany . |
| 7442223 | 7/1978 | France . |
| 1141695 | 5/1965 | United Kingdom . |
| 1014923 | 12/1965 | United Kingdom . |
| 1160546 | 8/1969 | United Kingdom . |
| 1173110 | 12/1969 | United Kingdom . |
| 1370674 | 10/1974 | United Kingdom . |
| 1422864 | 1/1976 | United Kingdom . |
| 1425093 | 2/1976 | United Kingdom . |
| 1455748 | 11/1976 | United Kingdom . |
| 1560167 | 12/1976 | United Kingdom . |
| 1475671 | 1/1977 | United Kingdom . |
| 1526414 | 9/1978 | United Kingdom . |
| 1532860 | 11/1978 | United Kingdom . |
| 2055196 | 12/1978 | United Kingdom . |
| 2006541 | 5/1979 | United Kingdom . |
| 2011734 | 7/1979 | United Kingdom . |
| 2012044 | 7/1979 | United Kingdom . |
| 2016787 | 9/1979 | United Kingdom . |
| 1575165 | 9/1980 | United Kingdom . |

OTHER PUBLICATIONS

Y. Ohmori & H. Ogiwara, Applied Optics, vol. 17, No. 22, pp. 3531 & 3532, Nov. 15, 1978.
IEEE Transactions on Instrumentation and Measurement, vol. IM-26, No. 1, 3/77 (New York) J. Blackburn, "A Radiation-Hardened Fiber-Optic Transmission System Having a 400-MHz Bandwidth and Linear Response", pp. 64-70.

*Primary Examiner*—Joseph A. Orsino, Jr.
*Attorney, Agent, or Firm*—Cushman, Darby & Cushman

[57] ABSTRACT

Apparatus for selectably positioning an optical fiber end along a range of positions comprising a bender assembly including at least one piezoelectric bender element and having a first end thereof arranged for association with one or more optical fiber ends and a second end thereof located at a reference position. Suitable application of electrical energy to the piezoelectric bender element causes it to assume a selected position along the range of positions. Various embodiments of bender assemblies and applications thereof in communications are also described.

8 Claims, 26 Drawing Figures

PIEZOELECTRIC APPARATUS FOR POSITIONING OPTICAL FIBERS

This is a continuation of my copending application Ser. No. 230,794 filed Feb. 2, 1981 now U.S. Pat. No. 4,543,663.

FIELD OF THE INVENTION

The present invention relates to optical fiber communication, and more particularly to optical fiber switching and interconnections.

BACKGROUND OF THE INVENTION

In recent years optical fibers have come into widespread use in a wide variety of applications and particularly in communications. The efficient utilization of optical fibers in many applications is dependent on the ability of associated apparatus to accurately and repeatably position optical fiber ends. Presently various mechanical devices such as x-y-z translators, concentric tubing and V-groove assemblies are employed for positioning of the optical fiber ends.

It has been proposed to employ a single piezoelectric bender element as a two position switch for an optical fiber. See Y. Ohmori & H. Ogiwara, Applied Optics, Vol. 17 No. 22 P.3531. This reference does not contain any suggestion of using such a bender element for selectable positioning along a range of positions.

Switching employing directable light beams has also been proposed in U.S. Pat. Nos. 3,985,975 and 4,065,644, using holograms and CRT tubes for directing the light beam.

The mechanical apparatus presently used for positioning of optical fibers involves significant disadvantages in terms of cost, design limitations and reliability. The inadequacies of presently known optical fiber positioning apparatus are believed to limit the introduction of optical fiber technology into many other possible applications.

SUMMARY OF THE INVENTION

The present invention seeks to overcome the disadvantages of the prior art apparatus for positioning optical fibers and to provide apparatus for positioning optical fibers which is characterized by greatly improved performance characteristics, design flexibility and economy and significantly smaller size.

There is thus provided in accordance with the present invention apparatus for selectably positioning an optical fiber end along a range of positions comprising a bender assembly comprising at least one piezoelectric bender element and having a first end thereof arranged for association with one or more optical fiber ends and a second end thereof located at a reference position. Suitable application of electrical energy to the piezoelectric bender element causes it to assume a selected position along the range of positions.

Further in accordance with an embodiment of the present invention there is provided apparatus for selectably positioning an optical fiber end comprising a bender assembly comprising a plurality of piezoelectric bender elements arranged in series and such that the motion of the bender elements have mutually perpendicular components.

The present invention also seeks to provide a switching exchange for telephone or other communications apparatus which is simple and which is easy to construct, economical and modular in the sense that it can be accommodated changeably to the growing needs of a customer.

There is thus provided in accordance with an embodiment of the invention a communications exchange comprising a first array of transmitters employing piezoelectric bender elements, each of which provides a beam of information bearing electromagnetic radiation in a selectable direction; a second array of electromagnetic radiation receivers arranged in radiation receiving relationship with the first array whereby the radiation output of any of the transmitters may be directed for receipt thereof by any selected one of the receivers. In accordance with the invention, instructions are provided to the transmitters for establishing communications between subscribers connected to respective transmitters and subscribers connected to respective receivers impinged upon by radiation from respective transmitters.

Further in accordance with an embodiment of the invention each subscriber is connected to one transmitter and to one receiver such that two-way communication is established by the way of modulated radiation beams. Preferably, every transmitter can communicate with every receiver.

Additionally in accordance with an embodiment of the present invention there is provided a communications exchange comprising a first array of transmitters, each of which provides a beam of information bearing electromagnetic radiation and at least one directable electromagnetic radiation receiver arranged for selectable radiation receiving relationship with one or more transmitters of the first array.

It is a particular feature of the present invention that substantially no cross talk is encountered since the intersection of electromagnetic radiation produces substantially no interference.

BRIEF DESCRIPTION OF THE DRAWINGS

The present invention will be more fully understood and appreciated from the following detailed description taken in conjunction with the drawings in which.

DETAILED DESCRIPTION OF THE INVENTION

The preferred embodiment of the invention will now be described with reference to FIGS. 1–24 which illustrate a variety of constructions thereof suitable for different applications.

Figure 1:
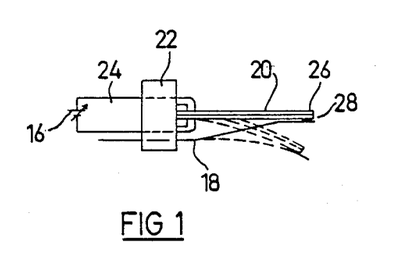
FIG. 1 illustrates a one-dimensional optical fiber end positioning device constructed and operative in accordance with an embodiment of the present invention.

Referring now to FIG. 1 there is seen apparatus for positioning an optical fiber end constructed and operative in accordance with a preferred embodiment of the present invention and comprising a generally elongate piezoelectric bender element 20 which is mounted at a first end thereof onto a base 22. The piezoelectric bender element 20 may be of conventional construction and manufacture such as a G-1278 Lead Zinconate-Titanate Thin Sheet piezoceramic manufactured by Gulton Industries of Metuchen, N.J., U.S.A. Leads 24 associated with the piezoelectric bender element may be connected to any suitable source of electrical voltage for controlling the position of the free end 26 of the bender element.

In accordance with the present invention, the free end 28 of an optical fiber 18 is attached as by glueing, clamping or by any other suitable means onto the free end 26 of the bender element 20 or adjacent thereto for motion together therewith. FIG. 1 illustrates bender element 20 in a straight orientation at rest when the bender element is de-energized and curved to one side when a voltage of a first polarity is applied to leads 24 by means of a selectable voltage source 16. It may be appreciated that normally the bender element may also be bent in an opposite direction by application of a voltage of an opposite polarity to leads 24. Furthermore any desired position intermediate the two extreme bent positions may be realized by the application of a suitable voltage to the leads 24.

It is a particular feature of the present invention that piezoelectric bender elements 20 of the type employed herein display a generally linear and repeatable position in response to voltage inputs within part of their operative range. The position-voltage characteristics can be calibrated and an open loop control may thus be employed. Relatively complex control circuitry employing microprocessor technology may be employed to take into account the hysteresis behaviour of the position voltage curve of the bender elements. Conventional technology is available for this purpose.

Figure 2:
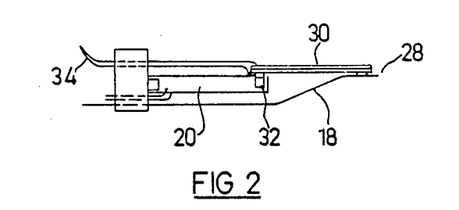
FIGS. 2 and 3 illustrate respective two- and three-dimensional counterparts of the device illustrated in FIG. 1.

Referring now to FIG. 2, there is seen apparatus for positioning an optical fiber end along two dimensions. The apparatus comprises the apparatus of FIG. 1 to which is attached at the free end of bender element 20 a second bender element 30 which is oriented such that its plane of bending lies perpendicular to the plane of bending of bender element 20. In the illustration, the apparatus of FIG. 1 is shown rotated 90 degrees from the illustration of FIG. 1 and bender element 30 is attached to the free end of bender element 20 by means of a mounting element 32 formed of metal or any other suitable material. Bender element 30 is provided with leads 34 which are coupled to position control circuitry (not shown). The free end 28 of the optical fiber is mounted on the free end of bender element 30.

Figure 3:
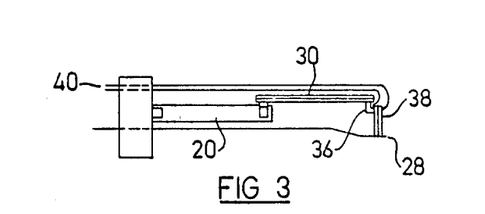

FIG. 3 shows apparatus for positioning an optical fiber end along three dimensions and comprises the apparatus of FIG. 2 to which is attached by means of a second mounting element 36 a third bender element 38 at the free end of second bender element 30. Leads 40 are associated with the third bender element 38 and are coupled to position control circuitry (not shown). In practice third bender element 38 is oriented such that its bending plane is perpendicular to the bending planes of bender elements 20 and 30 and serves to position the free end 28 of the optical fiber which is attached to its free end for focussing purposes. Bender elements 20 and 30 may be moved through their position ranges to provide a scanning function.

It is appreciated that the bender elements forming a multi-element bender assembly need not necessarily be arranged in perpendicular planes. Instead it may be sufficient that their directions of motion have respective perpendicular components.

Figure 4:
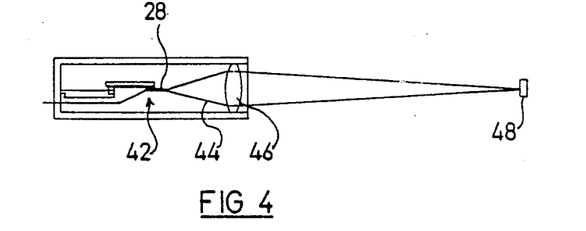
FIG. 4 is a schematic illustration of a directable transmitter.

FIG. 4 shows a simplified version of a transmitter useful in the present invention and comprising a selectable position modulatable light source 42 which is substantially similar to those illustrated in FIGS. 1, 2 and 3. The free end 28 of the optical fiber provides a beam of electromagnetic radiation 44 which impinges on a lens 46 which focusses the beam at a location which is selected to correspond to a receiver 48. The position of the optical fiber end 28 determines the location of the impinging focused beam.

Figure 5:
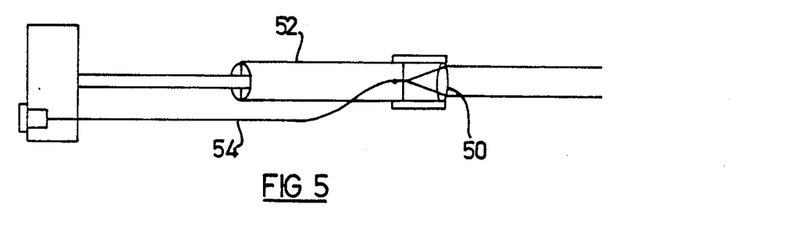
FIG. 5 is a schematic illustration of a transmitter constructed and operative in accordance with an alternative embodiment of the invention.

Reference is now made to FIG. 5 which illustrates a transmitter substantially similar to that illustrated in FIGS. 1, 2 and 3 with the difference being that here the lens 50 is mounted on the free end of the bender element 52 in front of the end of the fiberoptic conduit 54 and thus moves together with the free end of the bender element. Beam directing is achieved by changing the direction of the free end of the bender element. A rod lens may be used instead of the lens 50.

Alternatively, the elements described in FIGS. 4 and 5 may be utilized as directable radiation detectors.

Figure 6:
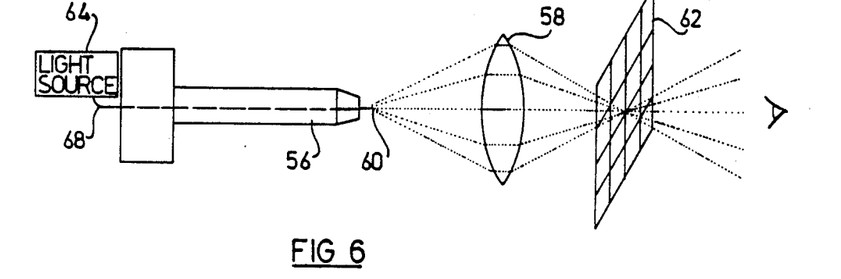
FIG. 6 illustrates display apparatus employing positioning devices of the present invention.

FIG. 6 illustrates one of the applications of the positioning apparatus illustrated in FIGS. 1, 2 and 3. In FIG. 6, two dimensional positioning apparatus 56, such as that illustrated in FIG. 2, is associated with a lens 58 which images light emerging from the free end 60 of the optical fiber onto a screen 62. A light source 64 which communicates with the opposite end of the optical fiber 68 supplies desired radiation which may be positioned on the screen or scanned thereover as desired, similar to the raster scan of a television but slower.

The apparatus of FIG. 6 is particularly suitable for use in slow scan applications in which cathode ray tubes are presently employed such as in Electrocardiographs.

Figure 7:
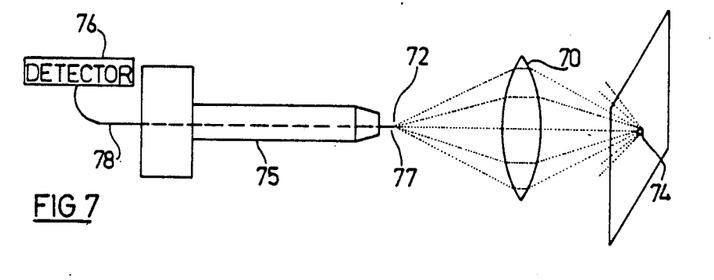
FIG. 7 illustrates detecting apparatus employing positioning devices of the present invention.

A radiation detector may be constructed using the positioner of the present invention as illustrated in FIG. 7. A lens 70 provides an image 72 of an object 74. Positioning apparatus 75 such as that illustrated in any of FIGS. 1, 2 and 3 positions the end 77 of the optical fiber 78 to the image location so as to enable light from the image to be transmitted along the optical fiber 78 to a detector 76.

In accordance with a preferred embodiment of the present invention, a plurality of images of radiation sources may be provided by lens 70. The positioning apparatus 75 is then operative to selectably and changeably position the optical fiber end at a selectable image, thus providing a directable receiver.

Figure 8:
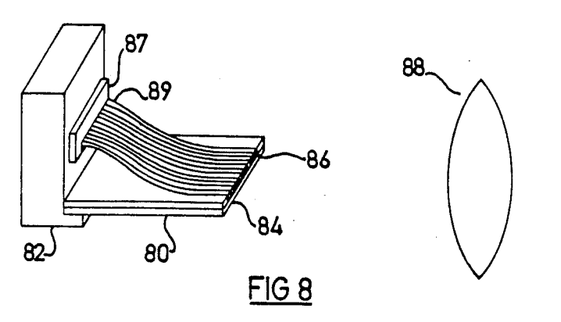
FIG. 8 illustrates a one-dimensional optical fiber end positioning device associated with a single array of optical fibers.

A multi-fiber end one dimensional scanner is illustrated in FIG. 8 and comprises a relatively wide piezoelectric bender element 80 mounted on a base 82 and having associated with the free end 84 thereof a one-dimensional array of optical fiber ends 86. Oscillation of bender element 80 along one dimension provides a raster scan of a scene imaged by a lens 88. A relatively fast scan may be provided in this manner. The optical fibers may be connected at their opposite ends 89 to a linear detector array 87.

Figure 9:
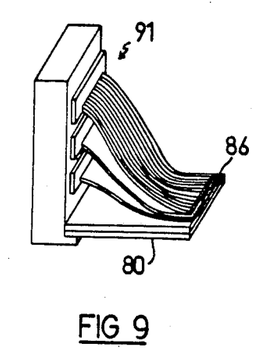
FIG. 9 illustrates a one-dimensional optical fiber end positioning device associated with a plurality of arrays of optical fibers.

As seen in FIG. 9, a plurality of arrays of optical fiber ends may be associated with a single bender element 80. In such a way a color television type camera may be constructed by employing detectors 91 having different spectral responses. Similarly a color television type camera may be constructed on the basis of the apparatus illustrated in FIG. 8 by employing optical fiber ends transmitting spectrally different light or detectors of different spectral response in array 87.

It may be appreciated that by replacing the detectors in the apparatus of FIGS. 8 and 9 with light sources, a raster scanned display may be provided.

Figure 10:
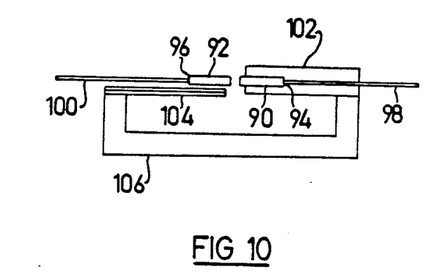
FIG. 10 illustrates optical fiber positioning apparatus employing rod lenses.

Referring now to FIG. 10 which illustrates selectable switching and coupling apparatus employing optical fiber ends, rod lenses 90 and 92 are connected to the free ends 94 and 96 of respective optical fibers 98 and 100. Rod lenses 90 and 92 are mounted on the free ends of respective piezoelectric bender elements 102 and 104 which are arranged to have perpendicular bending planes and are mounted onto a frame 106. It is noted that the bender elements are employed to selectably vary the direction of the rod lenses. In the illustrated embodiment, when the rod lenses are directed parallel, radiation transmission therebetween is permitted and when they are directed in different directions, little or no such transmission occurs.

It is noted with respect to the embodiments illustrated in FIG. 10 that a plurality of bender elements arranged in series in the sense of FIGS. 1, 2 and 3 may be employed. Also a plurality of optical fiber ends may be mounted on each bender element.

Figure 11A:
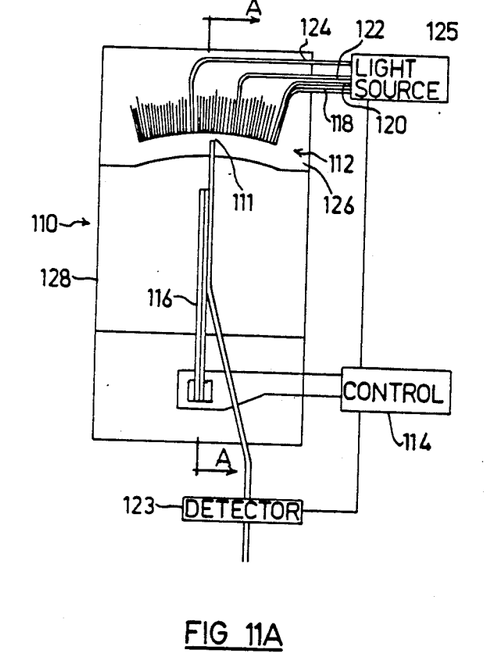
FIG. 11A illustrates a multi-position selector for coupling one optical fiber to a selected one of a plurality of optical fibers.
Figure 11B:
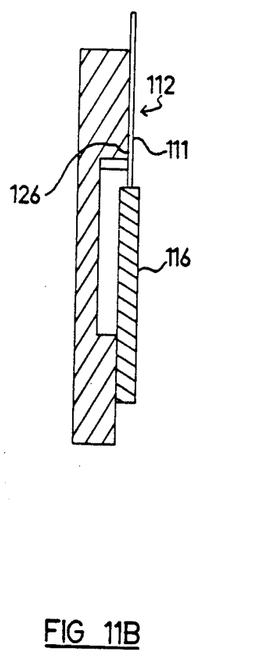
FIG. 11B is a sectional view taken along lines A—A of FIG. 11A.

Reference is now made to FIGS. 11A and 11B which illustrate an optical fiber switch 110 which is operative to selectably place an optical fiber end 111 in a desired alignment with a selectable one of an array 112 of optical fiber ends. In the illustrated construction a one-dimensional positioning device similar to that illustrated in FIG. 1 is employed for positioning of optical fiber end 111 and the array 112 of optical fiber ends are arranged in the bending plane of fiber end 111 in a radial orientation. It may be appreciated that control apparatus 114 may be provided for applying a desired voltage to the bender element 116 of the positioning device to effect alignment of fiber end 111 with a desired fiber end in array 112 for radiation transmission therewith.

All optical fiber ends 111 and 112 lie on flat surface 126 of the base 128 which produces the needed alignment of fibers in the plane parallel to surface 126. Again, two dimensional benders can be utilized to eliminate the need for surface 126 and a third bender element may be used to adjust the fiber end-to-end distances. The surface 126 may be grooved in order to define discreet positions for the fiber ends 112 for precise alignment thereof with fiber end 111.

Some of the fiber ends 112 may be used for calibration purposes. Suppose that fibers 118, 120, 122 and 124 are connected to a light source 125 having different light characteristics which can be distinguished from light emerging from the other fiber ends 112, and having part of the light entering fiber end 111 detected by detector 123. By scanning the fiber end 111 from a position facing fiber 118 to a position facing the end of fiber 120, the different voltages applied to the piezoelectric element 116 may be recorded while the light of source 125 is reaching peak value on detector 123. By extrapolation, the voltage needed to reach a position facing any of the fiber ends 112 may be calculated. Fibers 122 and 124 may serve to increase the accuracy of extrapolation.

The hysteresis behavior of the position-voltage characteristics of the piezoelectric element 116 will be covercome by letting the element travel a sufficient distance to have element 116 reach its linear characteristics before fiber end 111 comes to a position facing fiber 118.

Similar calibration can be achieved by replacing detector 123 with a light source and light source 125 with a detector.

Control circuitry 114 may conveniently comprise a microprocessor of conventional construction which is programmed to carry out the desired functions.

Figure 12:
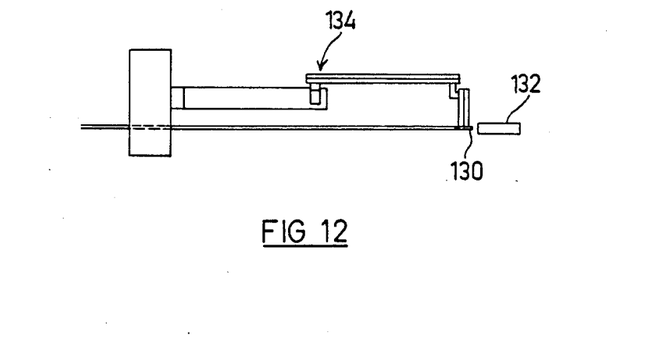
FIG. 12 illustrates coupling of an optical fiber to a radiation transmitter.

Reference is now made to FIG. 12 which illustrates the selectable coupling of an optical fiber end 130 to a light source 132 such as a laser diode. The optical fiber end 130 may be conveniently mounted at the free end of a positioning device 134, typically a three dimensional positioning device of the type illustrated in FIG. 3 and is positioned to face the light source 132 at a desired position relative thereto.

Figure 13A:
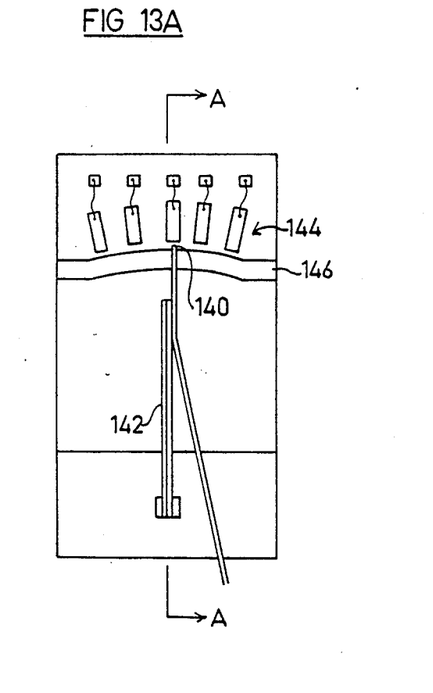
FIG. 13A illustrates coupling of an optical fiber to a selected one of a plurality of radiation transmitters.
Figure 13B:
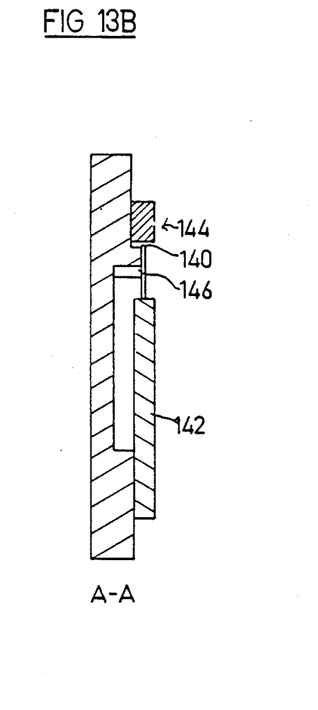
FIG. 13B is a sectional view taken along lines A—A of FIG. 13A.

A further refinement of the apparatus of FIG. 12 is illustrated in FIGS. 13A and 13B which illustrate apparatus for selectable coupling an optical fiber end 140 to a selected one of a plurality of light sources 144. Such an arrangement is particularly useful with laser diodes which are known to have limited lifetimes which are sometimes shorter than a desired servicing cycle. In such applications the operation of a bender element 142 of the type illustrated in any of FIGS. 1, 2 and 3 can be controlled to shift the fiber end to a new light source when the brightness of the old light source falls below a predetermined threshold.

Control of element 142 may be simply achieved by adjusting for maximum light to enter the fiber. Platform 146 is used together with a curved arrangement of lasers 144 to establish a minimum distance between the output area of the lasers and the center of the fiber end. The need for platform 146 and the arrangement of lasers 144 can be eliminated by having a two or three dimensional positioner instead of one dimensional positioner 142. The laser array 144 and platform 146 may be constructed from a unitary piece of material for production cost savings.

Figure 14:
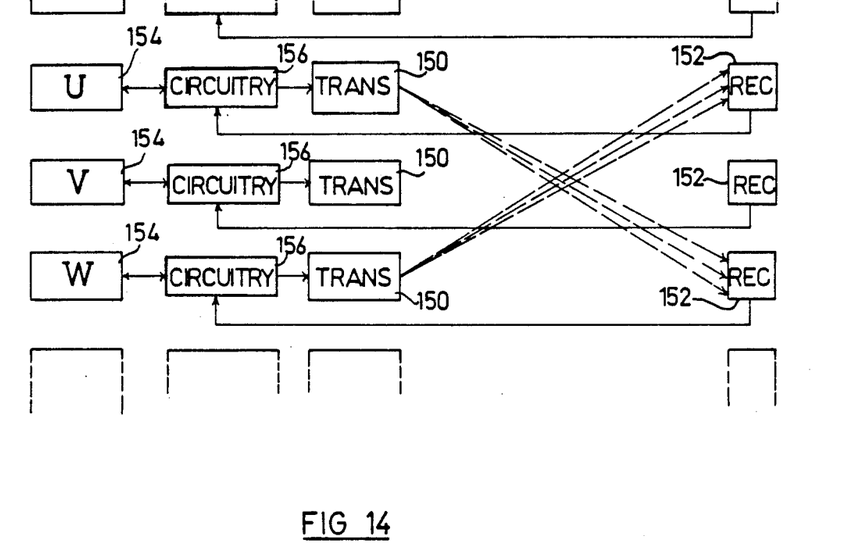
FIG. 14 is a schematic illustration of a portion of a communications exchange constructed and operative in accordance with an embodiment of the present invention.

Reference is now made to FIG. 14 which illustrates a portion of a communications exchange constructed and operative in accordance with an embodiment of the present invention. The exchange is suitable for use in telephone, telegraph, radio or any other mode of communication in which information can be transmitted via electromagnetic radiation.

The apparatus of FIG. 14 comprises an array of transmitters 150 disposed in spaced facing relationship to an array of receivers 152. Each subscriber, indicated by reference numeral 154, is interconnected with a single transmitter 150 and a single receiver 152 via circuitry 156, an exemplary embodiment of which will be described hereinafter in detail. In the illustrated embodiment, three subscribers U, V and W are shown connected to respective transmitters and receivers. Two way communication between subscribers U and W is illustrated, with a radiated beam of electromagnetic radiation being beamed by the transmitter of subscriber U so as to impinge on the receiver of subscriber W, and a radiated beam of electromagnetic radiation being beamed by the transmitter of Subscriber W to impinge on the receiver of subscriber U.

It is appreciated that there may be cases in which each subscriber may be associated with more than one transmitter and more than one receiver, as in conference call facilities, for example.

Any suitable form of electromagnetic radiation may be employed. In accordance with a preferred embodiment of the invention infra-red radiation is preferred.

Figure 15:
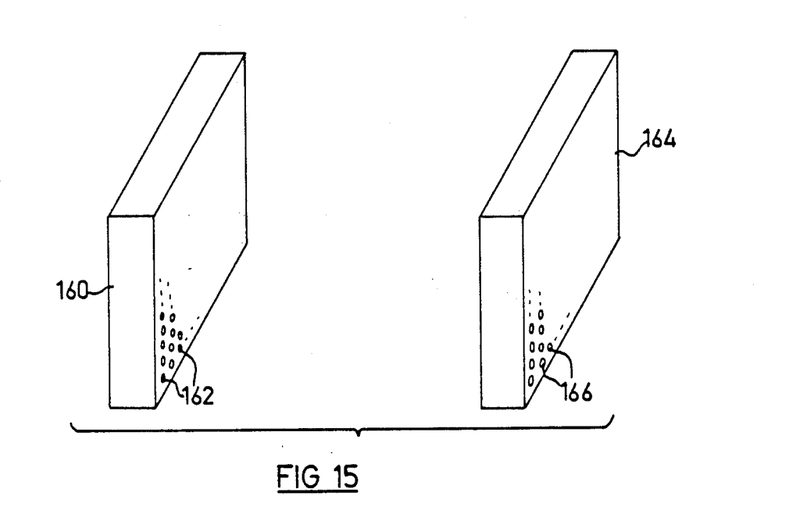
FIG. 15 is a schematic illustration of transmitter and receiver arrays useful in the exchange of FIG. 14.

Referring now to FIG. 15 there is seen, in schematic illustration, an array arrangement for a communications exchange constructed and operative in accordance with a preferred embodiment of the invention. There is provided a first array 160 of transmitters 162, disposed in selectable radiation communication relationship with a second array 164 of receivers 166. As seen in the illustrated example, arrays 160 and 164 are generally flat arrays disposed in spaced facing orientation such that a beam of radiation provided by any one of the transmitters 162 may selectively impinge on any individual one of the receivers 166 for the establishment of communication therebetween.

Each transmitter 162 is associated with a given subscriber and coupled thereto by apparatus prividing a modulated radiation beam containing information to be communicated. This modulation may take any suitable form depending on the communication requirements of the system. Each transmitter 162 may be constructed similarly to the directable transmitter described in FIG. 4, and the optical fiber may be coupled to a light emitting diode or laser diode.

Since modulation of light beams for communications applications is widely known in the literature it will not be described here, and reference will only be made here to the employment of such modulated light information transmission. A general description of light communication is provided in: Optical Communication Research and Technology; Fiber Optics, by T. G. Giallorenzi, Proc. of the IEEE, Vol. 66, No. 7, July, 1978, p. 744.

The receiving elements may typically comprise photo detectors each of which is coupled via suitable amplification means to a given subscriber.

Figure 16:
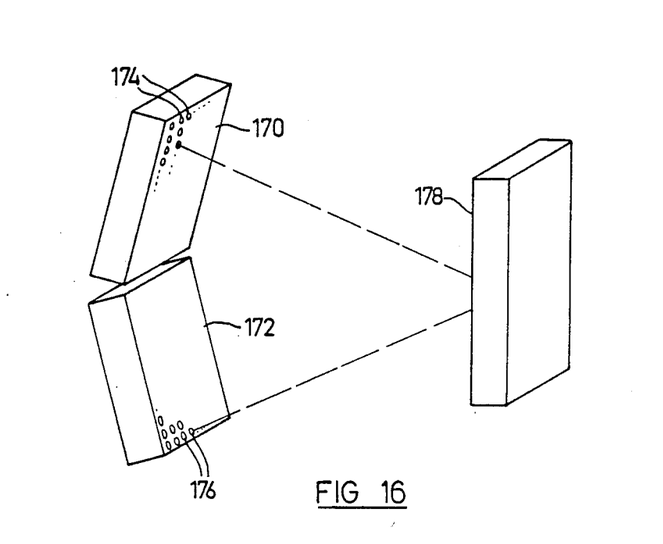
FIG. 16 shows alternative arrangements of transmitter and receiver arrays useful in the exchange of FIG. 14.

FIG. 16 illustrates an alternative form of arrangement of transmitters and receivers employing a reflecting element for communication. Here arrays 170 and 172, comprising transmitters 174 and receivers 176 respectively, are disposed in adjacent angled relationship facing a reflecting element 178 and arranged so that beams of radiation from any of the transmitters 174 can selectably impinge on any of the receivers 176.

Figure 17:
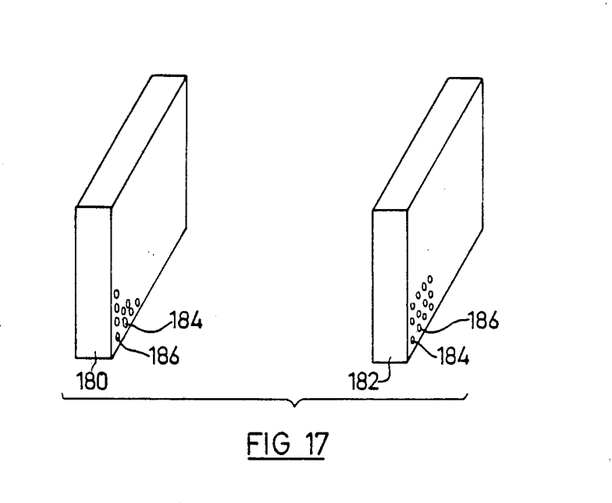
FIG. 17 is a schematic illustration of a switching exchange comprising a pair of facing arrays each having interspersed receivers and transmitters.

According to an alternative embodiment of the invention illustrated in FIG. 17 first and second arrays 180 and 182 are provided in respective facing arrangement. Each of the arrays comprises an interspersed arrangement of transmitters and receivers 184 and 186. It is appreciated that the transmitters and receivers 184 and 186 on the same array cannot communicate. Nevertheless, such a construction would be suitable for use with a submarine cable, where such local communication would not be required.

Figure 18:
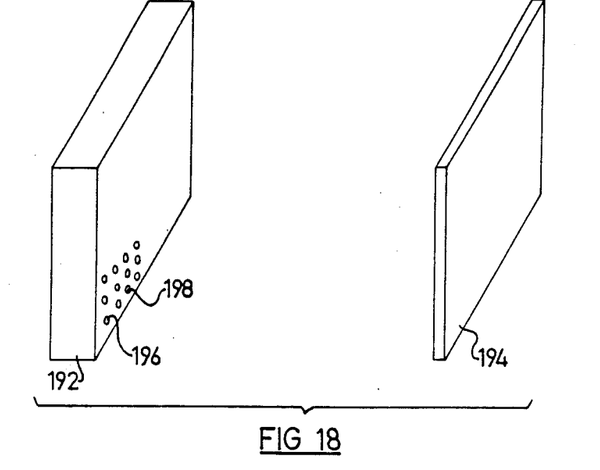
FIG. 18 is a schematic illustration of a switching exchange comprising an array of interspersed Freceivers and transmitters and a reflecting element.

FIG. 18 shows an alternative embodiment of the invention in which a single array 192 is arranged facing a reflecting element 194. Array 192 comprises an interspersed arrangement of transmitters 196 and receivers 198. It is appreciated that in this arrangement any of the transmitters 196 can communicate with any of the receivers 198.

Figure 19:
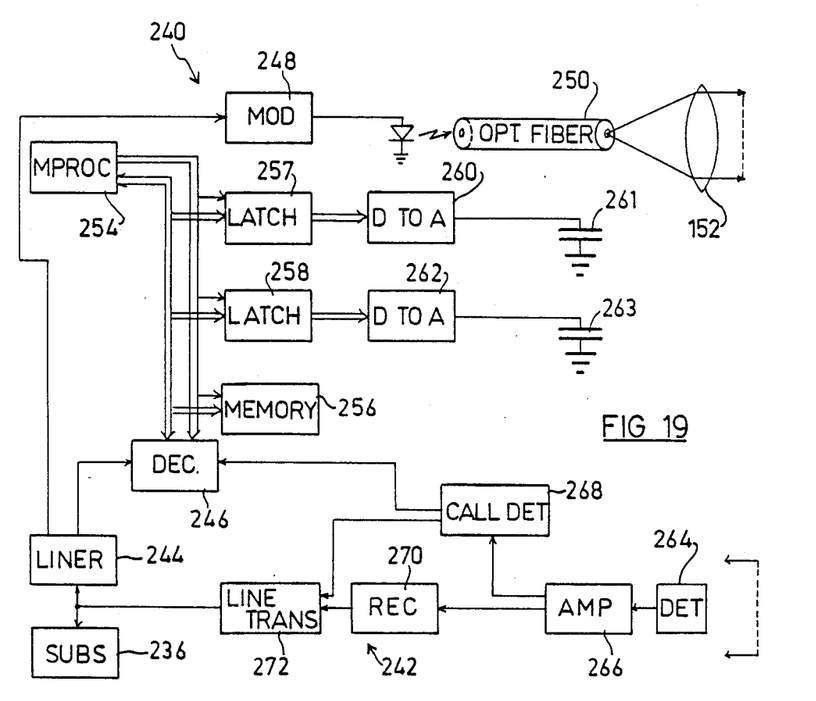
FIG. 19 is a block diagram illustration of transmission and receiving apparatus associated with a single subscriber in the exchange of FIG. 14.

Reference is now made to FIG. 19 which illustrates transmission and receiving apparatus associated with a single subscriber in the exchange of FIG. 14. A subscriber, 236 which may represent any desired type of communications terminal is coupled to transmitter and receiver circuits 240 and 242, respectively. Transmitter circuit 240 comprises a line receiver 244 which separates the dialing information (in the case of a telephone link) or alternatively the address instructions from the voice or data information. The dialing information passes to a dialing information decoder 246 while the voice or data information passes to a modulator 248.

The voice or data information causes the modulator 248 to operate a source of radiation, for example a LED with a selectable modulation representative of the voice or data signal received thereby. This radiation is transmitted along an optical fiber link 250 and from an end thereof through a lens 252 which beams the radiation at a desired receiver.

The dialing or address instructions are employed to determine the angular orientation of the radiation beam, typically by suitable energization of a piezoelectric bender element, as shown in FIG. 2. The dialing decoder 246 employs a conventional microprocessor 254, such as an Intel 8080 and memories 256 for decoding received address or dialing inputs into X and Y position co-ordinates.

Decoder 246 provides X and Y position outputs along a data bus to first and second latches 257 and 258, each of which is coupled to a respective Digital to Analog converter 260 and 262. Digital to Analog converter 260 is coupled to the electrodes of a piezoelectric bender element 261 arranged to bend along an X-axis and converter 262 is coupled to the electrodes of a piezoelectric bender element 263 arranged to bend along a Y-axis.

The receiver circuit 242 comprises a wide field of view detector 264 which is arranged to receive an incident beam of light from a transmitter and which provides an output to an amplifier 266. Amplifier 266 provides an output to a call detector 268 which may be of conventional construction and which interfaces with the dialing information decoder 246 for producing dialing or address information on the basis of information given by the incoming beam.

Amplifier 266 also provides an output to a demodulator 270 which provides a decoded voice or data output to a line transmitter 272 which also receives an address or dialing input from call detector 268 and which is coupled to the subscriber terminal.

Signalling can be accomplished using a common electrical bus shared among all of the subscribers and a time ordered usage of this bus by subscribers.

An alternative control arrangement may be utilized using a central processor unit shared among several subscribers.

According to a preferred embodiment of the invention, a switching exchange may be constructed having a 10,000 subscriber capacity and comprising transmitter and receiver arrays arranged in a 100×100 grid. In such an example, each array would have to be of area 1 m², each transmitter and receiver being separated by 10 mm from each adjacent transmitter and receiver in their respective arrays. Assuming that the arrays are arranged in facing relationship as shown schematically in FIG. 15, the separation between the arrays would be approximately 5 meters.

If a transmitter of the general type illustrated in FIG. 2 were employed, the diameter of the fiber optic core would be 5 microns and the focal length of the lens 5 mm. The diameter of the spot of radiation impinging on the opposite array would be 8 mm. The f number of the lens would be between 1 and 2. The field of motion of the free end of the fiber optic would be 1×1 mm.

The preferred piezoelectric bender element is catalog number G-1278 manufactured by Gulton Industries, Inc., of New Jersey and is made of Zirconate Titanate. It has a piezoelectric constant as follows: $d_{31} = -270 \times 10^{-12}$ m/v. The thickness of the piezoelectric bender element is selected to be 0.125 mm and its length is selected to be 25 mm. Its voltage requirement is 50 volts for producing a 1 mm movement. The light source is preferably a LED and the detector is P.I.N. Silicon.

Figure 20:
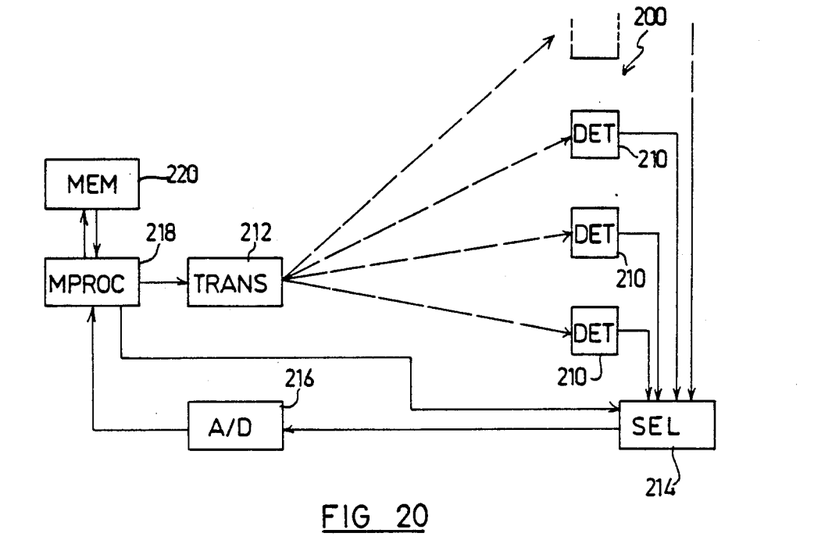
FIG. 20 illustrates, in block diagram form, apparatus for calibrating the transmission apparatus illustrated in FIG. 19.

FIG. 20 illustrates calibration apparatus for a beam directing system such as that employed for directing the transmitter beams in accordance with dialing or address information. A plurality of detectors 210 are arranged facing a transmitter 212. The detectors 210 may conveniently be arranged in a grid 200 and are individually connected to a selector circuit 214. The selector is coupled to an analog to digital converter 216 which in turn is coupled to a microprocessor 218, which may be of conventional construction and interfaces with one or more EPROM memories 220. The microprocessor 218 provides direction signals to the transmitter 212 and selection signals to selector 214.

Calibration is effected as follows:

A beam is transmitted in sequence to the individual detectors 210 disposed on grid 200, which defines the detection surface. The signal received by each detector will be maximized by adjustment of the beam direction. The instructions producing the best direction for each detector are written on the EPROM and this data may be used to interpolate for any other detectors intermediately positioned between detectors 210. The microprocessor 218 may be employed as microprocessor 154 (FIG. 19).

Figure 21:
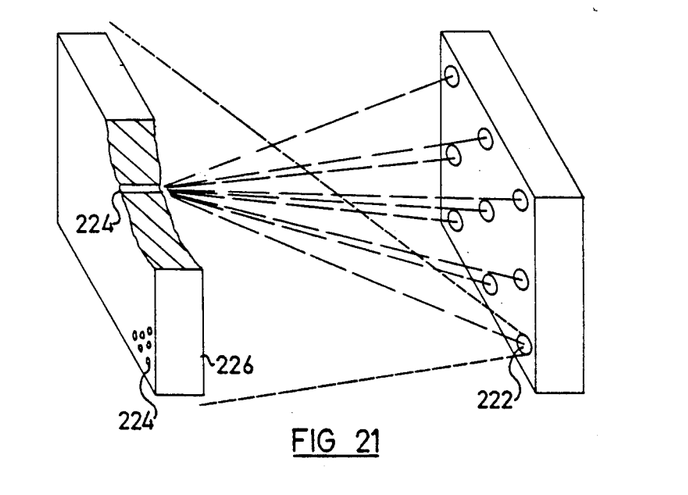
FIG. 21 is a schematic illustration of a switching exchange useful for cable television and similar transmissions.

Reference is now made to FIG. 21 which illustrates another type of switching exchange. Here, as opposed to the configurations described hereinabove, a plurality of transmitters 222 provides a wide beam that impinges on substantially all of the receivers 224 arranged in a facing grid 226. Each receiver 224 is coupled to a subscriber and is selectably directable so as to receive the radiation from only a single transmitter 222 at any given time. It is noted that this type of exchange is particularly useful in cable television systems.

It may be appreciated that the switching exchange operates by providing to each selectably directable receiver 224 control inputs which causes it to aim its detector at a desired single transmitter, thus coupling a subscriber associated with that receiver to the information channel associated with that transmitter. In a cable television system, each television receiver receives a broadcast channel by controlling the directable receiver 224. The optical fiber that emerges from receiver 224 may be extended towards the television receiver and carry T.V. channel information directly to the receiver.

Figure 22:
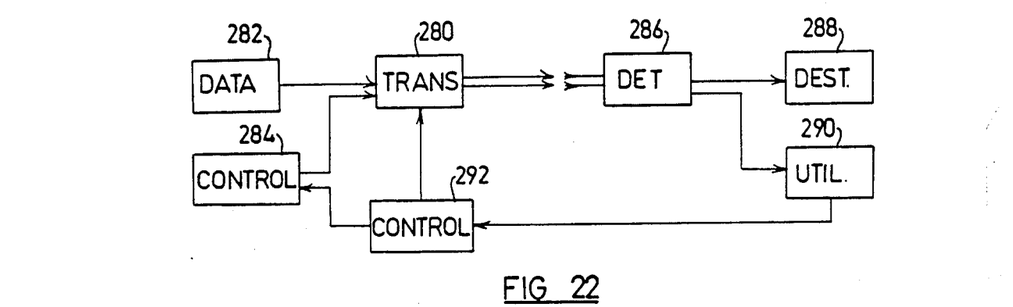
FIG. 22 is a block diagram illustration of apparatus for high accuracy feedback control of a directional transmitter.

Reference is now made to FIG. 22 which is a block diagram illustration of apparatus for high accuracy feedback control of a directional transmitter. The transmitter 280, which may be a transmitter of the type illustrated in any of FIGS. 1, 2 and 3, receives a signal input from a data source 282 and from a control signal source 284. A detector 286 receives the combined data and control signals which may be differentiated from each other by conventional frequency filters or equivalent techniques. The data outputs from detector 286 are supplied to a data destination 288 and the control outputs from detector 286 are supplied to a control signal utilization circuit 290. A microprocessor control 292 senses the received control signal at circuit 290 and aims the transmitter accordingly.

Figure 23:
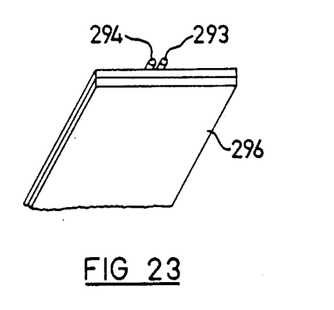
FIGS. 23 and 24 ar pictorial illustrations of arrangements of optical fibers associated with piezoelectric bender assemblies in accordance with the present invention.

FIG. 23 illustrates an arrangement of a pair of optical fibers 293 and 294 arranged on the free end of bender element 296. Preferably one of the optical fibers is a data carrying fiber while the other carries control information for assisting in accurate aiming.

Figure 24:
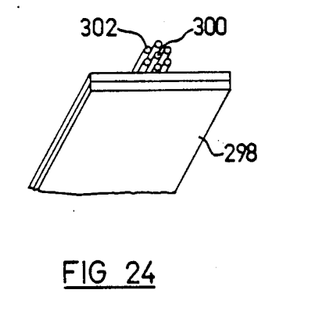

FIG. 24 shows a plurality of optical fibers arranged on the free end of bender element 298. A center fiber 300 carries data while the remaining fibers 302 carry control signals for providing a very high level of aiming accuracy.

Bender assemblies having a plurality of optical fibers associated therewith an including both data and control information carrying fibers may be incorporated in any of the switching exchanges illustrated in FIGS. 14, 15, 16, 17, 18, 19, 20, 21.

It will be appreciated by persons skilled in the art that the invention is not limited to the particular examples illustrated and discussed herein. Rather the scope of the present invention is defined only by the claims which follow.

I claim:

1. Switching apparatus for selectably positioning an optical fiber end comprising:
- a bender assembly including series-connected piezoelectric devices and which comprises:
  - a first generally planar piezoelectric device having a free end and adapted for bending motion in a first mode in which said device bends perpendicularly to the plane of said device;
  - a second generally planar piezoelectric device having a free end and being attached at its other end to a free end of said first device, said second device being adapted for bending motion in a second mode in which said device bends perpendicularly to the direction of bending motion of said first device; and
  - a third generally planar piezoelectric device having a free end and being attached at its other end to a free end of said second device, said third device being adapted for bending motion in a third mode in which said device bends perpendicularly to the directions of bending motion of both said first device and said second device;
  - said bender assembly having a one of said piezoelectric device free ends arranged for association with at least one optical fiber end and a mounting end thereof located at a reference position.

2. Apparatus according to claim 1 and also comprising at least one second optical fiber end arranged for selectable radiation communication with said at least one optical fiber end by means of suitable positioning of said at least one optical fiber end, for providing switching.

3. Apparatus according to claim 2 and also comprising means for measuring the intensity of radiation travelling along said optical fibers.

4. Apparatus according to claim 3 and also comprising feedback means responsive to the intensity of radiation measured by said measuring means for governing the positioning of said at least one optical fiber end.

5. Apparatus according to claim 1 and also comprising a collimating lens arranged in optical communication with said at least one optical fiber end.

6. Switching apparatus comprising a plurality of wide beam optical transmitting units and at least one directable receiving unit including a selectably orientable device, said plurality of wide beam optical transmitting units having overlapping transmission beams at said at least one directable receiving unit, said at least one directable receiving unit being operative to be selectably oriented by said selectably orienting device in the direction of a selectable one of said wide beam optical transmitting units; and wherein said selectably orienting device comprises apparatus for selectably positioning an optical fiber end including:
- a bender assembly including series-connected piezoelectric devices and which comprises:
  - a first generally planar piezoelectric device having a free end and adapted for bending motion in a first mode in which said device bends perpendicularly to the plane of said device;
  - a second generally planar piezoelectric device having a free end and being attached at its other end to a free end of said first device, said second device being adapted for bending motion in a second mode in which said device bends perpendicularly to the direction of bending motion of said first device; and
  - a third generally planar piezoelectric device having a free end and being attached at its other end to a free end of said second device, said third device being adapted for bending motion in a third mode in which said device bends perpendicularly to the directions of bending motion of both said first device and said second device;
  - said bender assembly having a one of said piezoelectric device free ends arranged for association with at least one optical fiber end and a mounting end thereof located at a reference position.

7. Apparatus according to claim 6 and also comprising at least one second optical fiber end arranged for selectable radiation communication with said at least one optical fiber end by means of suitable positioning of said at least one optical fiber end, for providing switching.

8. Apparatus according to claim 6 and also comprising means for measuring the intensity of radiation and feedback means responsive to the intensity of radiation measured by said measuring means for governing the positioning of said at least one optical fiber end.

* * * * *